United States Patent
Bücker et al.

(10) Patent No.: US 7,503,178 B2
(45) Date of Patent: Mar. 17, 2009

(54) THERMAL POWER PLANT WITH SEQUENTIAL COMBUSTION AND REDUCED-$CO_2$ EMISSION, AND A METHOD FOR OPERATING A PLANT OF THIS TYPE

(75) Inventors: Dominikus Bücker, Munich (DE); Timothy Griffin, Ennetbaden (CH); Dieter Winkler, Lauchringen (DE)

(73) Assignee: Alstom Technology Ltd, Baden (CH)

( * ) Notice: Subject to any disclaimer, the term of this patent is extended or adjusted under 35 U.S.C. 154(b) by 203 days.

(21) Appl. No.: 11/453,971

(22) Filed: Jun. 16, 2006

(65) Prior Publication Data

US 2006/0272331 A1   Dec. 7, 2006

Related U.S. Application Data

(63) Continuation of application No. PCT/EP2004/053123, filed on Nov. 26, 2004.

(30) Foreign Application Priority Data

Dec. 23, 2003   (DE) ............................... 103 60 951

(51) Int. Cl.
*F02C 7/16* (2006.01)
(52) U.S. Cl. ................ 60/774; 60/39.17; 60/39.52
(58) Field of Classification Search ............... 60/39.17, 60/39.52, 772, 774, 806
See application file for complete search history.

(56) References Cited

U.S. PATENT DOCUMENTS

| 4,498,289 | A  | * | 2/1985  | Osgerby ................ 60/39.52 |
| 5,906,095 | A  |   | 5/1999  | Frutschi et al. |
| 6,161,385 | A  |   | 12/2000 | Rebhan et al. |
| 6,199,363 | B1 |   | 3/2001  | Frutschi |
| 6,530,226 | B1 |   | 3/2003  | Harazim |
| 6,957,539 | B2 | * | 10/2005 | Lebas et al. ............... 60/772 |

FOREIGN PATENT DOCUMENTS

| DE | 43 03 174 A1 | 8/1994 |
| EP | 0 795 685 B1 | 9/1997 |

OTHER PUBLICATIONS

International Search Report dated Mar. 17, 2005.

\* cited by examiner

*Primary Examiner*—Louis J Casaregola
(74) *Attorney, Agent, or Firm*—Buchanan Ingersoll & Rooney PC

(57) ABSTRACT

A thermal power plant with sequential combustion and reduced $CO_2$ emissions is disclosed, which includes the following components, which are connected in series via in each case at least one flow passage (S): a combustion feed air compressor unit, a first combustion chamber, a high-pressure turbine stage, a second combustion chamber and a low-pressure turbine stage. The second combustion chamber and/or the low-pressure turbine stage can be supplied with a cooling gas stream for cooling purposes. A method for operating a thermal power plant of this type is also disclosed.

25 Claims, 7 Drawing Sheets

Figure 1:
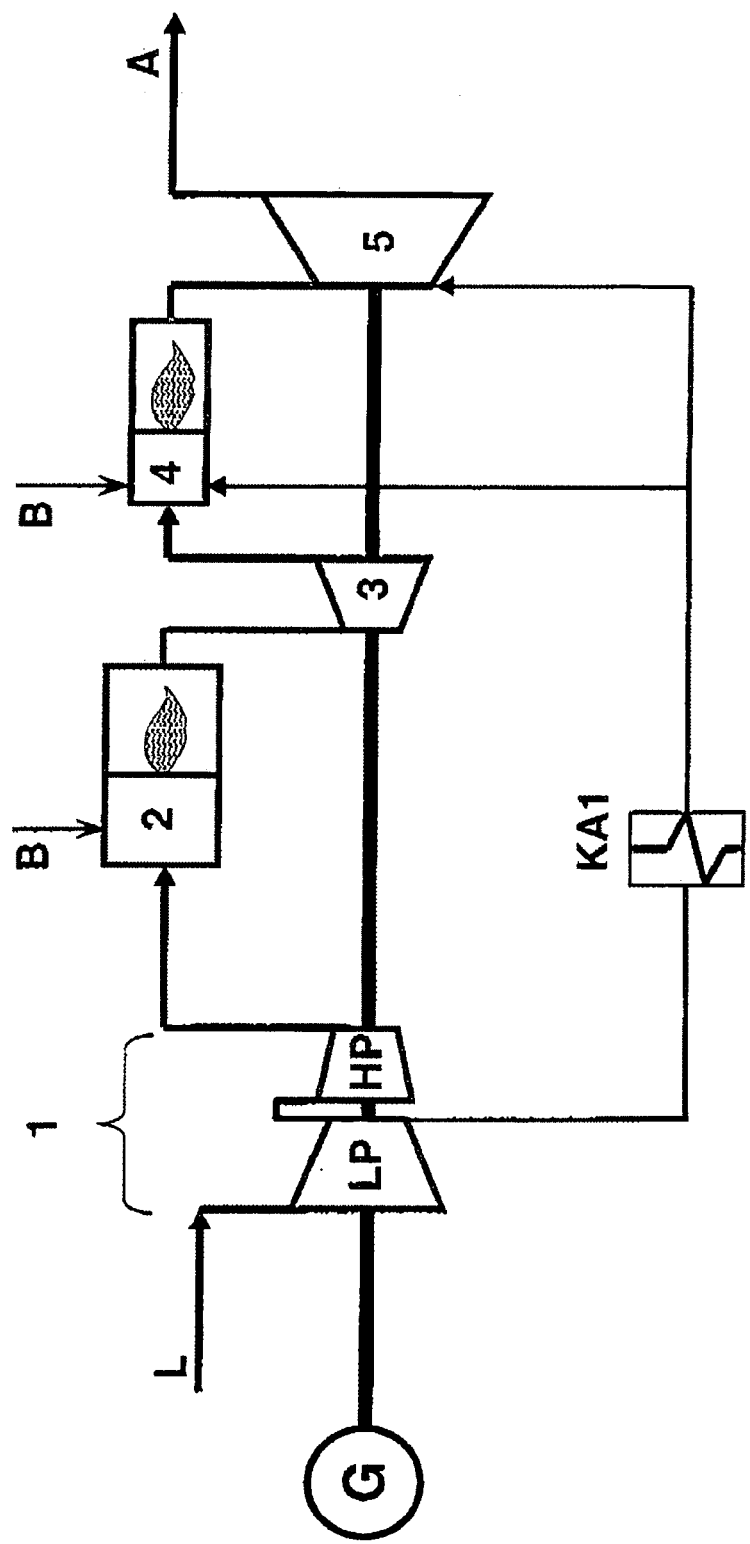

THERMAL POWER PLANT WITH SEQUENTIAL COMBUSTION AND REDUCED-$CO_2$ EMISSION, AND A METHOD FOR OPERATING A PLANT OF THIS TYPE

FIELD OF THE INVENTION

The invention relates to a thermal power plant, preferably a gas turbine plant, with sequential combustion and reduced $CO_2$ emissions, which includes the following components, which are connected in series via in each case at least one flow passage: a combustion feed air compressor unit, a first combustion chamber, a high-pressure turbine stage, a second combustion chamber and a low-pressure turbine stage, it being possible for the second combustion chamber and/or the low-pressure turbine stage to be supplied with a cooling gas stream for cooling purposes. The invention also describes a method for operating a thermal power plant of the above type.

BACKGROUND OF THE INVENTION

In the context of global warming, efforts have been made for some time to reduce the emission of greenhouse gases, in particular $CO_2$, to the atmosphere. Numerous advances have already been made in this respect, leading to the $CO_2$ generated during the combustion of fossil fuels being partly to completely separated out. In this context, the generation of electrical energy by firing combustion chambers for driving gas turbine plants, the exhaust emissions from which form a not inconsiderable proportion of the volume of emissions discharged to atmosphere by man-made sources, is of particular interest in this context. With a view to reducing the discharge of $CO_2$ to the open atmosphere which is caused by gas turbine plants, there are known techniques for separating $CO_2$ out of the exhaust gas stream from gas turbine plants, which by recirculating the exhaust gas stream separate out $CO_2$ at the highest possible pressure. It is fundamentally the case that the higher the $CO_2$ partial pressure in the exhaust gas stream, the better the efficiency of $CO_2$ separation. To increase the pressure of the exhaust gas stream, the latter is compressed, in a manner known per se, by means of the combustion feed air compressor unit of the gas turbine plant, the recirculated exhaust gas being diluted with fresh air, with the result that, on the one hand the oxygen content of the combustion feed air which is to be compressed by the compressor unit and furthermore also the $CO_2$ concentration of the recirculated exhaust gas are reduced. As a result of the lower oxygen content of the compressed mixed air formed by the recirculated exhaust-gas routing, which, as it flows on through the gas turbine plant, is then fed to the burner, in which the mixed air is converted into an ignitable fuel/air mixture by admixing fuel, and is finally ignited in the combustion chamber, in particular in certain circumstances what is known as combustion instability occurs, in which the combustion within the combustion chamber takes place without any excess oxygen. Combustion instability of this nature on the one hand leads to high CO emissions and on the other hand leads to the formation of thermo-acoustic oscillations, which can greatly impair operation of the gas turbine plant. On the other hand, the $CO_2$ content, which has been reduced by mixing with combustion feed air, in the recirculated, compressed exhaust gas flow leads to a lower efficiency of $CO_2$ separation. The invention is intended to remedy this situation and provide a way of operating gas turbine plants which allows efficient separation of $CO_2$ out of the recirculated exhaust gas flow without having a long-term effect on the stable burner properties.

SUMMARY OF THE INVENTION

The invention is based on the object of developing a thermal power plant, preferably of a gas turbine plant with sequential combustion and reduced $CO_2$ emissions in accordance with the preamble of claim 1 in such a manner that the efficiency of the $CO_2$ separation from the exhaust gas stream from a gas turbine plant can be optimized with the lowest possible outlay in terms of plant engineering and without having a long-term adverse effect on the operating performance and in particular the emissions of the gas turbine plant. The measure according to the invention is furthermore to offer the option of retrofitting to gas turbines which are already in operation. Furthermore, it is an objective to provide a corresponding method for operating a gas turbine plant in this respect.

The solution to the object on which the invention is based is given in claim 1. The subject matter of claim 16 is a method for operating a thermal power plant, preferably a gas turbine plant. Features which advantageously develop the concept of the invention form the subject matter of the subclaims and are to be found in particular in the description with reference to the exemplary embodiments.

According to the invention, a thermal power plant, preferably gas turbine plant, with sequential combustion and reduced $CO_2$ emissions, which includes the following components, which are connected in series via in each case at least one flow passage: a combustion feed air compressor unit, a first combustion chamber, a high-pressure turbine stage, a second combustion chamber and a low-pressure turbine stage, it being possible for the second combustion chamber and/or the low-pressure turbine stage to be supplied with a cooling gas stream for cooling purposes, is developed in such a manner that a recirculation line is provided, which feeds at least some of an exhaust gas stream emerging from the low-pressure turbine stage to a cooling unit. At least some of the compressed exhaust gas stream emerging from the cooling unit is fed as a cooling gas stream via a cooling line to the second combustion chamber and/or the low-pressure turbine stage for cooling purposes, with the result that the gas turbine components which are exposed to the hot gases formed within the second combustion chamber can be effectively cooled. Moreover, a $CO_2$ separation unit, which separates at least some of the $CO_2$ out of the cooling gas stream, is provided in the cooling line. The invention is therefore substantially based on a gas turbine plant with sequential combustion, in which the recirculated exhaust gas is compressed, by means of a correspondingly provided compressor unit, to an intermediate pressure, at which the $CO_2$ separation takes place, and which, moreover, allows the $CO_2$-depleted exhaust gas stream, as a cooling gas stream at the intermediate pressure level to be fed into the second combustion chamber and preferably also into the low-pressure turbine stage for cooling purposes. For the purposes of efficient cooling, the precompressed, recirculated exhaust gas stream, before it enters the $CO_2$ separation unit, is passed through a cooler. That part of the cooling gas stream which is used to cool the second combustion chamber is warmed back to the working temperature of the low-pressure turbine by the sequential combustion, with the result that there is no loss of efficiency. Further details can be found in the exemplary embodiments with reference to the following figures.

In a preferred embodiment, the firing of the second combustion chamber, known as the sequential burner stage, provides for the use of partial oxidation, in which, to set a stoichiometric combustion, the second combustion chamber is combined with an oxidation unit, by means of which fuel for firing the second combustion chamber is at least partially oxidized, releasing hydrogen, and is ignited, at least together with the $CO_2$-depleted exhaust gas stream used as cooling gas, to form a stoichiometric fuel/oxygen mixture. The hot gases emerging from the high-pressure turbine stage can be admixed with the cooling gas stream proportionally to the oxygen content which is present within the cooled, $CO_2$-depleted exhaust gas stream. Further details, also in this context, can be gathered from the exemplary embodiments described below.

It is in principle possible for the compression of the recirculated exhaust gas stream to be carried out within a low-pressure compressor part of the combustion feed air compressor unit, in which case, however, the result is admixing with fresh air, with the drawbacks described in the introduction. In a particularly advantageous embodiment, an exhaust gas compressor unit which is provided as an extra part for compression of the recirculated exhaust gas stream is used to increase the pressure of the exhaust gas stream to a specific intermediate pressure level in order to be fed onward as a cooling gas flow into the above-described sequential combustor unit and into the low-pressure turbine stage.

Therefore, the method according to the invention for operating a thermal power plant with sequential combustion and reduced $CO_2$ emissions is distinguished by the fact that at least some of the exhaust gas emerging from the low-pressure turbine stage is recirculated, compressed and fed to a $CO_2$ separation, to obtain $CO_2$, and that the $CO_2$ depleted exhaust gas stream is provided as cooling gas stream for cooling purposes.

BRIEF DESCRIPTION OF THE INVENTION

The invention is described below by way of example, and without restricting the general concept of the invention, on the basis of exemplary embodiments and with reference to the drawings, in which:

FIG. 1 shows a gas turbine with sequential combustion which is known per se (prior art), FIG. 2-7 show schematic process diagrams for a gas turbine plant formed in accordance with the invention with sequential combustion and an exhaust gas stream with reduced $CO_2$ content.

WAYS OF IMPLEMENTING THE INVENTION, INDUSTRIAL APPLICABILITY

FIG. 1 illustrates a schematic, simplified process diagram of a gas turbine installation with sequential combustion which is known per se. The gas turbine plant substantially comprises a high-pressure turbine stage 3 and a low-pressure turbine stage 5, with sequential combustion 4 located in between these two stages. Feed air L is compressed to a high pressure level in a combustion feed air compressor unit 1 via two compressor stages LP, HP. This air is premixed with fuel B and burnt in a standard combustion chamber 2. The hot gas generated in the combustion chamber 3 is then expanded to the intermediate pressure in the high-pressure turbine stage 3. Since the hot gas originating from the first, lean premixed combustion still contains more than half its original oxygen content, fuel B is admixed again immediately upstream of a special sequential combustion chamber 4 and ignited. This reheated hot gas is expanded downstream in a low-pressure turbine stage 5 to atmospheric pressure, with the expanded hot gases ultimately being released to the open atmosphere in the form of an exhaust gas stream A. It is particularly advantageous for some of the combustion feed air which has been precompressed in the low-pressure compressor part LP to be branched off and cooled by means of a cooling unit KA1 and then to be fed for cooling purposes to the sequential combustion chamber 4 and also to the low-pressure turbine stage 5.

Figure 2:
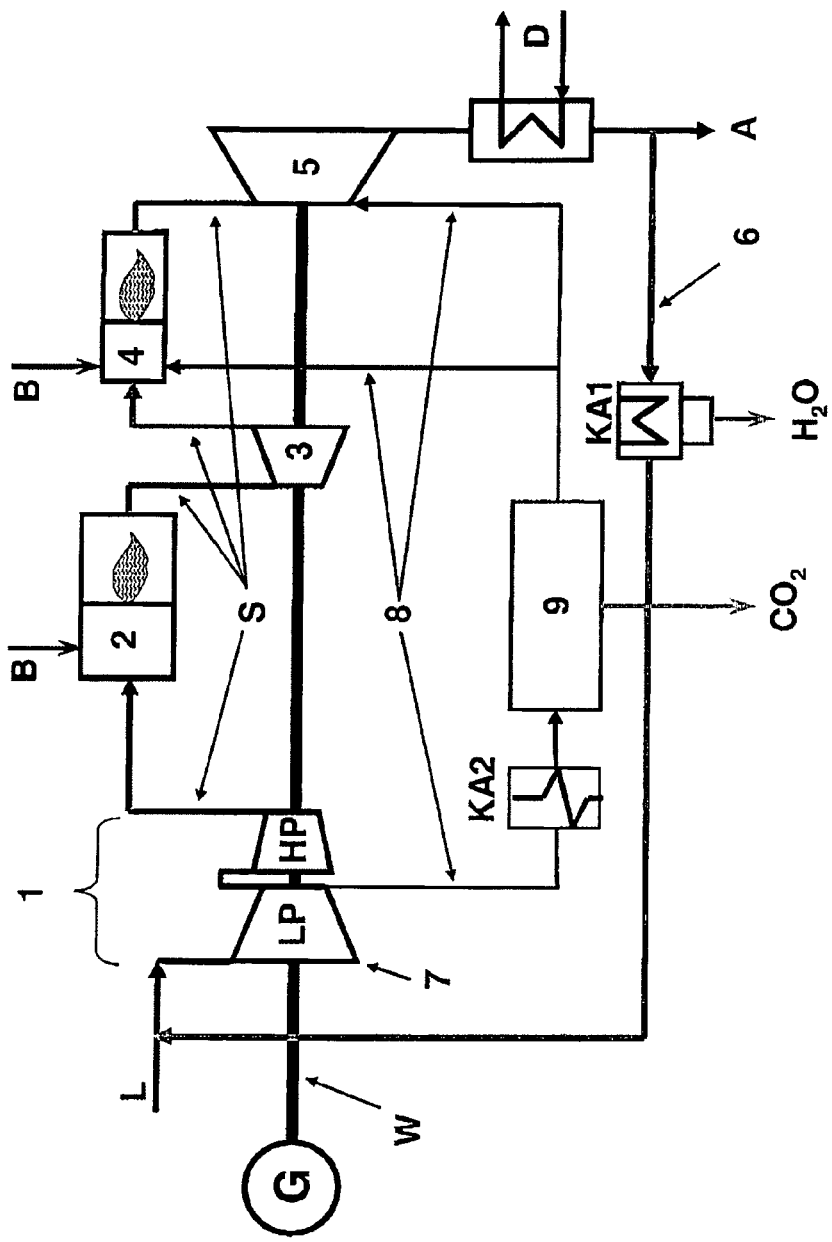
Figure 3:
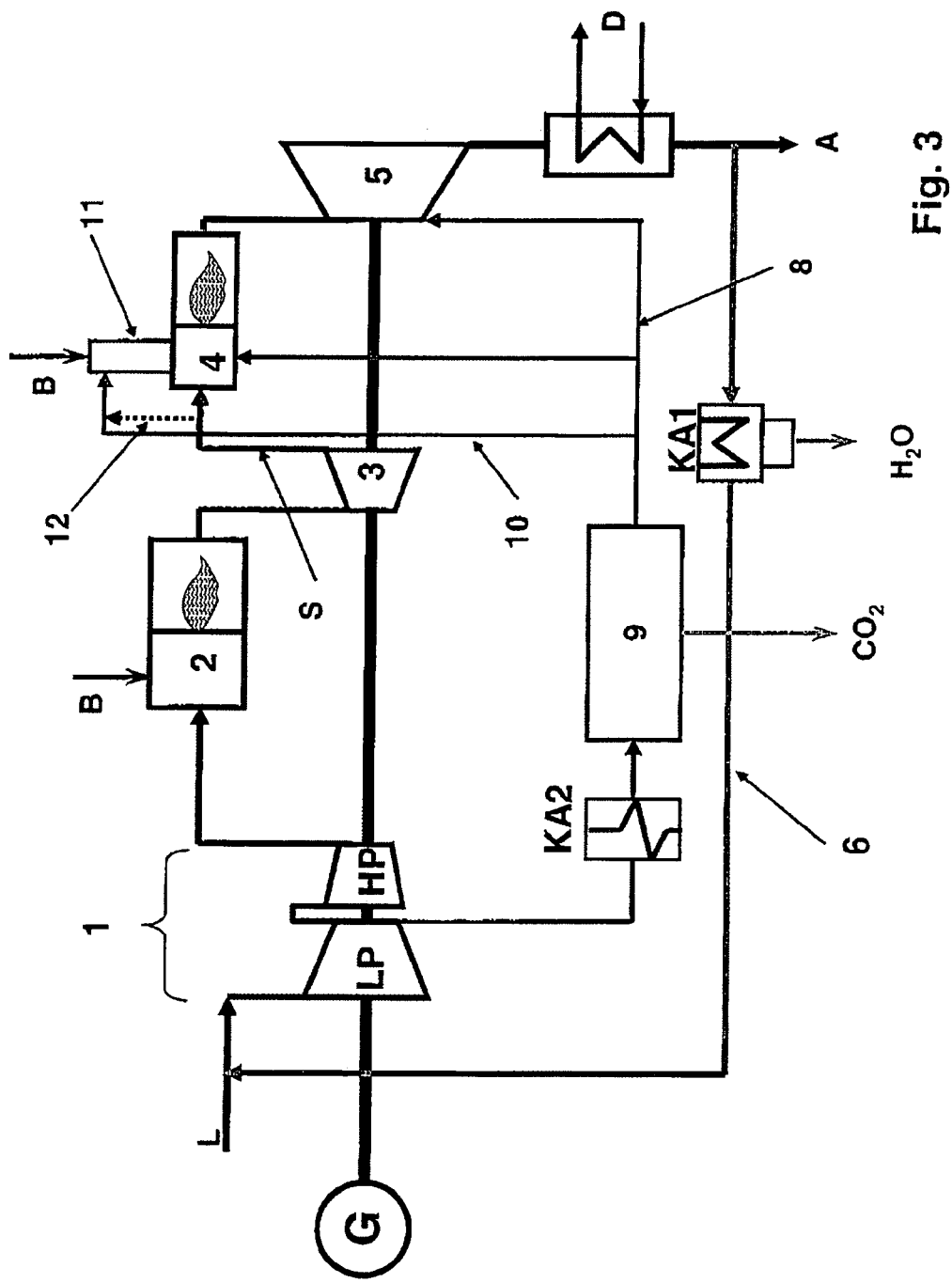

Proceeding from the gas turbine plant with sequential combustion and staged operation which had been described above and is known per se, according to the exemplary embodiment shown in FIG. 2, the exhaust gas A which emerges from the low-pressure turbine stage 5 is recirculated via a recirculation line 6 into the feed air stream for the low-pressure compressor unit 7, in which the recirculated exhaust gas is mixed with the feed air and compressed to an intermediate pressure level. The recirculated exhaust gas A advantageously passes through a heat exchanger unit D along the recirculation line 6; at the heat exchanger D, heat is transferred to a steam cycle, for example for driving a steam turbine (not shown in more detail). Furthermore, the recirculation line 6 provides a cooler unit KA1, in which firstly the exhaust gas is cooled and dehumidified by way of condensation.

The exhaust gas, which has been precompressed to intermediate pressure by the low-pressure compressor part LP, then passes via what is known as a cooling line 8, into a $CO_2$ separation unit 9, in which very efficient $CO_2$ separation takes place on account of the prevailing high intermediate pressure level. A further cooler unit KA2 is advantageously provided upstream of the $CO_2$ separation unit 9. Separation apparatuses which are known, per se, such as for example chemical absorption, e.g. based on MEA or physically acting separators, e.g. based on membranes, are suitable for the $CO_2$ separation unit. $CO_2$ separator efficiencies of between 70 and 99% can be achieved with the aid of $CO_2$ separation units of this type. The $CO_2$-depleted exhaust gas stream which emerges from the $CO_2$ separation unit 9, for cooling purposes, is passed on to the sequential burner unit 4 and the low-pressure turbine stage 5, with that part of the cooling gas stream which is used to cool the second combustion chamber, as a result of the sequential combustion, being warmed back to the working temperature of the low-pressure turbine, with the result that there is no loss of efficiency.

As long as the sequential compressor stage 4 is operating with an excess of oxygen, an aerodynamically stable premix flame front is formed within the combustion chamber, i.e. the combustion operation is stable. However, if the recirculated exhaust gas quantity is increased to such an extent that the oxygen content in the highly compressed combustion air fed to the first combustion chamber 2 is only just sufficient for complete combustion of the fuel B supplied, the combustion in the sequential combustor stage 4 takes place at an even lower entry oxygen content without an excess of oxygen. Although for reasons of achieving a particularly high level of $CO_2$ removal combined with the maximum possible exhaust gas recirculation this state is particularly desirable, and in addition during an operating mode of this type the minimal oxygen content within the respective combustion zones leads to very low NOx emission values, experience has shown that under these combustion conditions, combustion instability occurs, for example in the form of thermo-acoustic oscillations, high CO emissions and also sudden extinguishing of the premix flame. To counteract these negative combustion phenomena and at the same time to be able to exploit the advantages which have been described of combustion under stoichiometric oxygen conditions, use is made of what is known as partial oxidation. In this context, reference is also made to the exemplary embodiment shown in FIG. 3, which illustrates a process diagram for a gas turbine plant which, with the exception of a modification made to the sequential combustor stage 4, is otherwise identical to the process diagram illustrated in FIG. 2. To avoid repetition, for explanations of reference designations which have already been described in FIG. 2, reference is made to the corresponding exemplary embodiment given above.

In the text which follows, it will be assumed that the recirculated exhaust gas is admixed into the combustion feed air L to an extent which is such that the oxygen content in the feed air for the combustion chamber 2 is just sufficient for combustion of the fuel B supplied. As explained above, the sequential combustion in the combustion chamber 4 takes place with a deficit of oxygen. To avoid the associated drawbacks described above, fuel B is first of all reacted, under oxygen deficit conditions, within what is known as an oxidation unit 11. The oxidation unit 11 is advantageously designed as a catalyst unit which is fed on the one hand with the fuel B that is to be oxidized and on the other hand with a quantity of oxygen in the range between 20 and 75% of the theoretical oxygen demand for complete oxidation of the fuel. The quantity of oxygen supplied is introduced via the feed line 10, which branches off part of the $CO_2$-depleted exhaust gas from the cooling line 8. If the oxygen content contained in the $CO_2$-depleted exhaust gas stream is insufficient to meet the required oxygen content to carry out partial oxidation, it is additionally possible for some of the hot gases emerging from the high-pressure turbine stage 3 to be admixed with the $CO_2$-depleted exhaust gas stream via the feed line 12 in order to be fed into the oxidation stage 11.

As a result of the partial oxidation within the oxidation stage 11, some of the hydrogen is separated out of the hydrocarbon compounds of the fuel B and after the partial oxidation stage 11 is present in the form of free hydrogen in the hot outlet mixture before it enters the sequential combustion stage 4. If the hot gases emerging from the high-pressure turbine stage 3, together with this gas mixture containing hydrogen fractions, are then fed to the sequential combustion stage 4, the high temperature and high reactivity of the hydrogen which is present leads to spontaneous reaction and complete burn-off of the fuel which is still present in the form of hydrogen, CO and residual hydrocarbons. The high reactivity of the burner mixture particularly advantageously leads to stable combustion within the sequential combustion stage 4, so that the drawbacks mentioned in the introduction with regard to the occurrence of thermo-acoustic oscillations, high CO emissions and the extinguishing of the premix burner flame can be completely avoided.

In an advantageous embodiment for carrying out the partial oxidation, it is appropriate to use a fuel feed lance within the sequential combustion stage 4, within which the reaction of the supplied fuel B by the use of a catalyst, as required to release hydrogen, takes place.

Although the measures described above serve to optimize the combustion processes taking place in the combustion chambers 2 and 4, according to the invention the primary objective is to reduce the $CO_2$ content of the exhaust gases released from the gas turbine installation. The higher the $CO_2$ concentration fed to the $CO_2$ separation unit 9 used in the cooling line 8 according to the invention, the more efficiently the separation unit operates. To implement this, in the exemplary embodiments shown in FIGS. 2 and 3, the recirculated exhaust gas is precompressed by means of the low-pressure compressor part LP of the combustion feed air compressor unit 1. However, one drawback of this embodiment is that the recirculated exhaust gas is mixed with the feed air L supplied, and therefore they are compressed together within the low-pressure compressor part LP. Consequently a dilute, precompressed exhaust gas stream passes into the $CO_2$ separation unit 9. To avoid this "dilution effect", it is proposed, with reference to the exemplary embodiment shown in FIG. 4, that a separate compressor be used for the recirculated exhaust gas. For this purpose, a separate exhaust gas compressor unit 7, in which, exclusively, the recirculated exhaust gas is compressed via the recirculation line 6 and is then fed via the cooler unit KA2 to the $CO_2$ separation unit 9, is provided on a common shaft W, along which the combustion feed air compressor unit 1 and the high-pressure and low-pressure turbine stages 3, 5 are arranged. In this way, the high $CO_2$ concentration in the exhaust gas is retained, with the result that it is possible to increase the efficiency of the $CO_2$ separation unit 9. In the case of a stoichiometric operating mode of the combustion process, as described above, the exhaust gas no longer contains any oxygen, and consequently can also no longer be used for combustion, for example by way of partial oxidation. Therefore, the process diagram of the exemplary embodiment shown in FIG. 4 does not provide a partial oxidation stage, but rather the $CO_2$-reduced exhaust gas is now used only for cooling purposes within the sequential combustor stage 4 and the low-pressure turbine stage 5. Recirculation lines 13 are provided for setting the stoichiometric operating mode of the combustion processes within the combustion chambers 2, 4, via which the recirculated exhaust gas which has been compressed within the exhaust-gas compressor unit 7 is fed either directly, in cooled form or in $CO_2$-reduced form after passage through the $CO_2$ separation unit 9, to the high-pressure compressor stage HP, for the purposes of metered admixing with the feed air L.

A bypass line 14 is optionally used to bypass the $CO_2$ separation unit 9 as part of the compressed and cooled recirculated exhaust gas stream in situations in which the recirculated exhaust gas stream exceeds the uptake capacity of the $CO_2$ separation unit 9.

Figure 4:
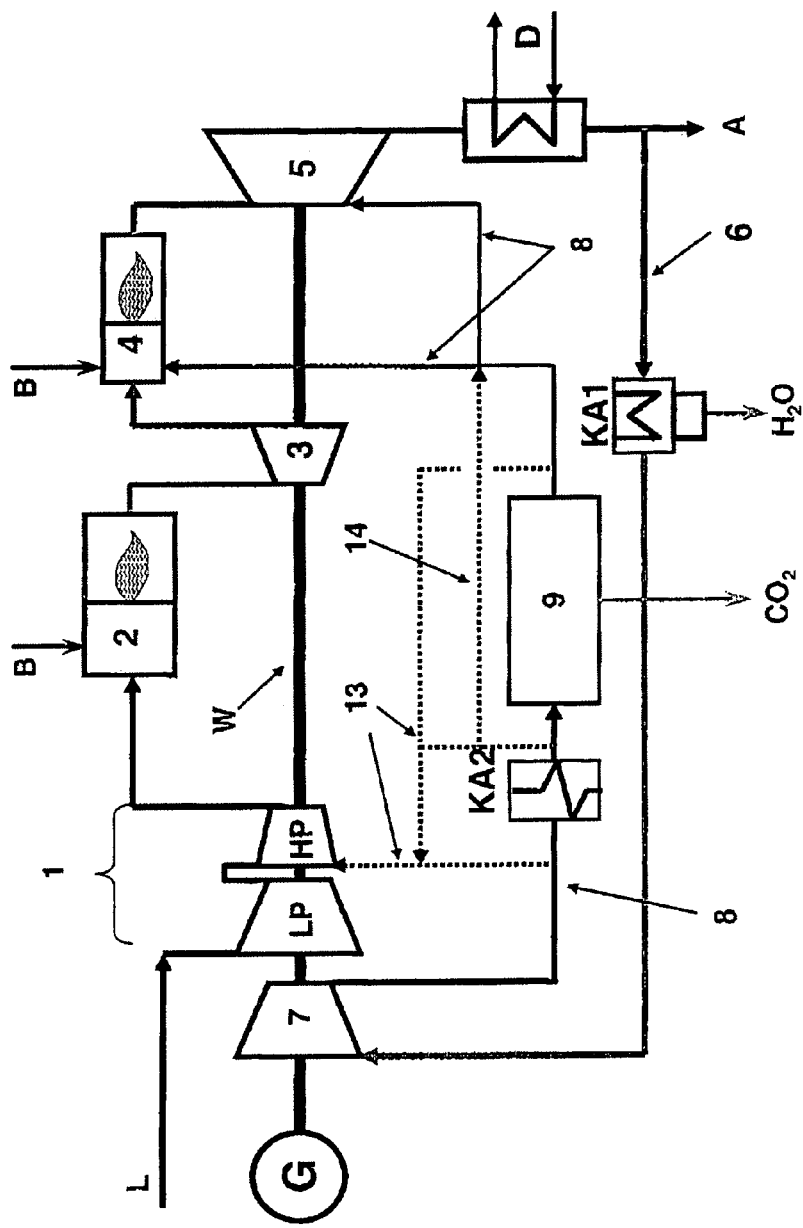
Figure 5:
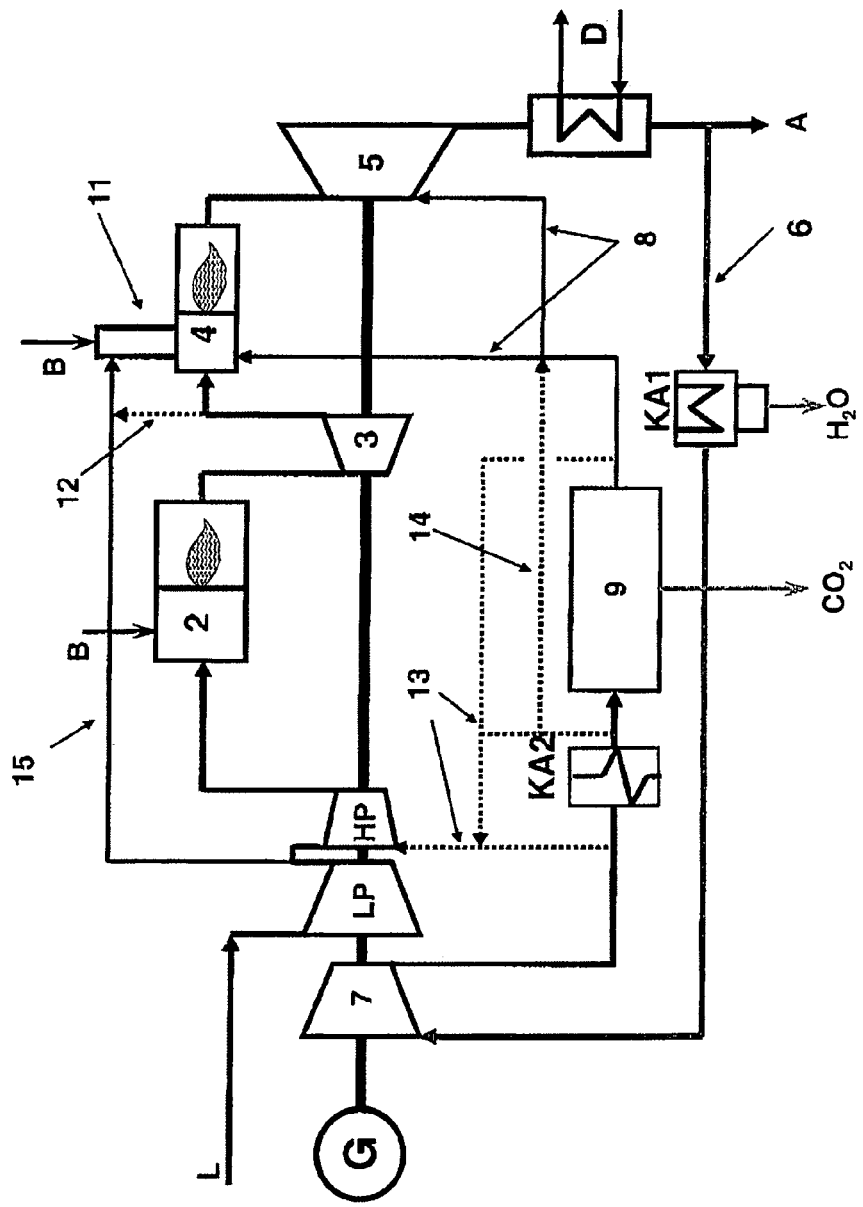

FIG. 5 illustrates a further exemplary embodiment, which similarly to the exemplary embodiment shown in FIG. 4, provides a separate $CO_2$ compressor stage 7; in addition, the sequential combustion takes place by way of partial oxidation, with the oxygen quantity fed to the partial oxidation stage 11 being supplied via a bypass line 15, which downstream of the low-pressure compressor part LP allows some of the precompressed feed air L to be deliberately passed into the oxidation unit 11, in which the fuel is partially oxidized, releasing hydrogen. It would also be possible, as an alternative to or in combination with the bypass line 15, for hot gases which emerge from the high-pressure turbine stage 3 to be fed via the feed line 12 to the oxidation unit 11 in order to carry out the partial oxidation of the fuel B.

All the exemplary embodiments described above relate to gas turbine plants, along the single shaft W of which the generator unit G, the combustion feed air compressor unit 1 and the high-pressure turbine stage 3 and low-pressure turbine stage 5 are arranged. In situations in which the recirculated exhaust gas is compressed in a separate exhaust gas compressor unit 7, the latter is also arranged along the common shaft W.

Figure 6:
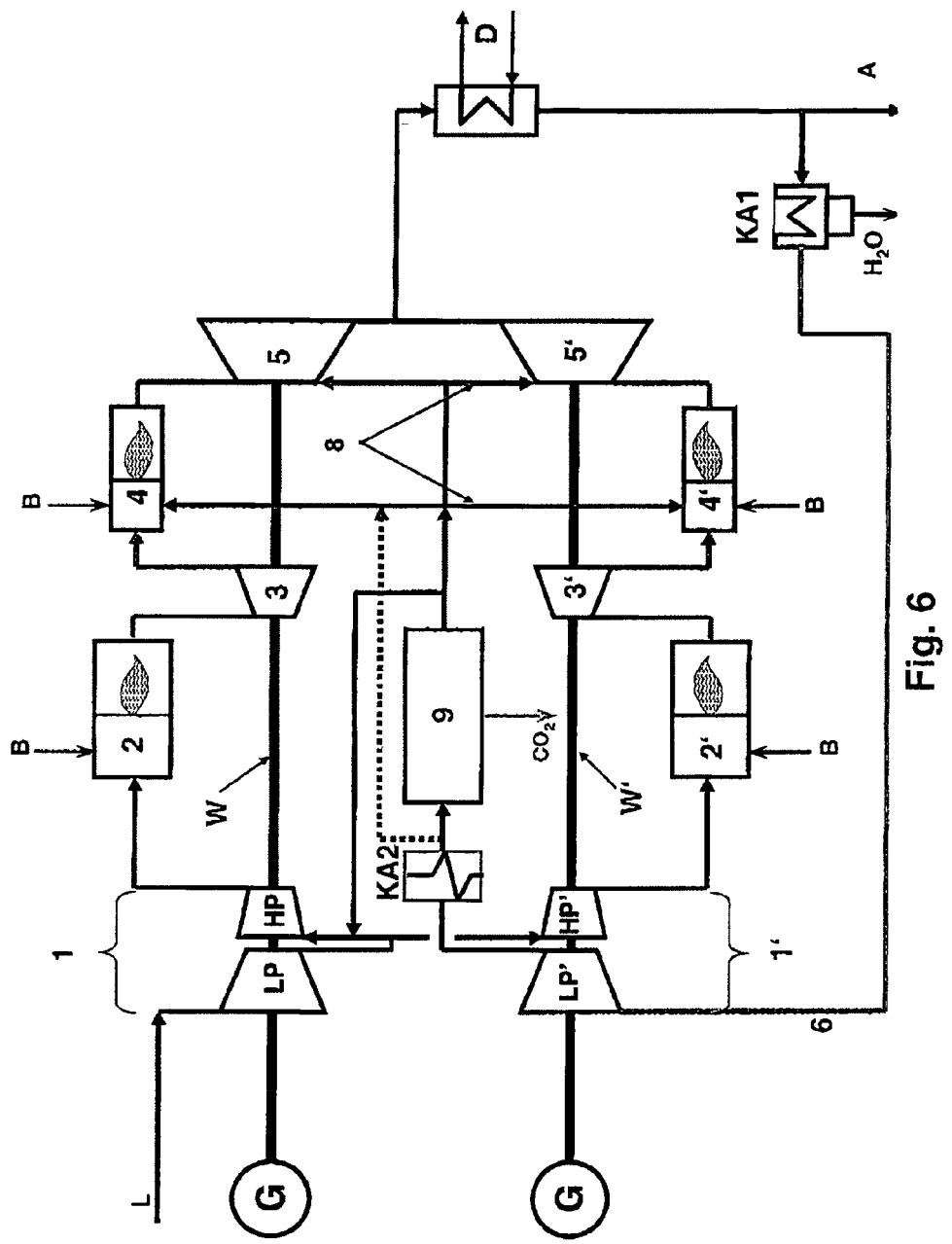

Not least to facilitate retrofitting of the measure according to the invention in gas turbine plants which are already in operation, it is recommended for the compressor unit used to compress the recirculated exhaust gas to be arranged on a separately driven shaft. A process diagram of a gas turbine plant of this type is illustrated in FIG. 6. If the process diagram which has been described in FIG. 2 is used as the basis, the difference of the gas turbine plant shown in FIG. 6 is that a second shaft W', which is driven by a separate gas turbine comprising the high-pressure turbine part 3' and low-pressure turbine part 5', is additionally provided. The high-pressure turbine part 3' and low-pressure turbine part 5' are each fed with hot gases which each emerge from the combustion chambers 2' and 4'. To supply the combustion chambers 2' and 4' with the combustion feed air required for the combustion, the high-pressure compressor stage HP', like the high-pressure compressor stage HP, is supplied with the precompressed feed air L which originates from the low-pressure compressor stage LP of the combustion feed air compressor unit 1. By contrast, the recirculated exhaust gas, which is fed to the low-pressure compressor stage LP' of the combustion feed air compressor unit 1' via the recirculation line 6 and compressed to an intermediate pressure, is not admixed with the combustion feed air, but rather is passed exclusively via a cooled outlet line into the $CO_2$ separation unit 9.

As a result of the separate compression of the recirculated exhaust gas within the low-pressure compressor stage LP', a highly compressed and in particular high-concentration $CO_2$ exhaust gas stream is fed to the $CO_2$ separation unit, and $CO_2$ can then be separated out of this exhaust gas stream very efficiently. The significantly $CO_2$-reduced exhaust gas stream is likewise, as has already been described in the exemplary embodiments above, fed for cooling purposes to the sequential combustion chamber 4 and 4' and also to the low-pressure turbine stages 5 and 5'.

Figure 7:
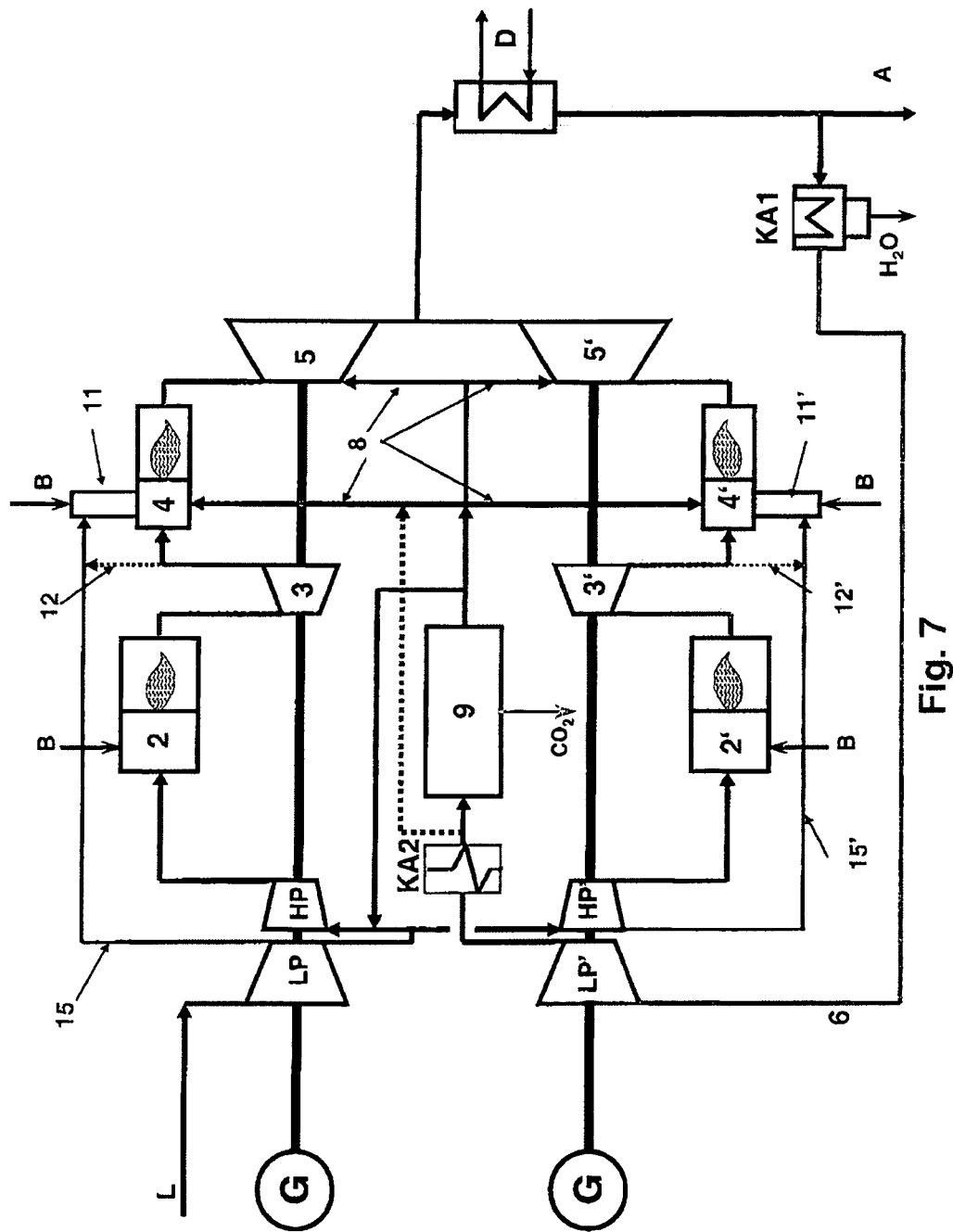

Although the gas turbine plant illustrated in FIG. 6 can considerably reduce the $CO_2$ content of the exhaust gas stream A emerging from the gas turbine installation, for system reasons complete $CO_2$ separation out of the exhaust gas stream which emerges into the open atmosphere is not possible. This is because exhaust-gas fractions from the low-pressure turbine stage 5 are contained in the exhaust gas stream A and remain in the exhaust gas stream on account of the lack of recirculation. However, in order also to minimize these fractions, the final exemplary embodiment, shown in FIG. 7, provides for the use of the partial oxidation. The process diagram illustrated in FIG. 7 represents a refinement of the process diagram illustrated in FIG. 6 in the context of the partial oxidation which has been described with reference to FIG. 5. In the exemplary embodiment shown in FIG. 7, too, the bypass line 15, 15' is used for the targeted supply of oxygen in the range between 20 and 75% of the theoretical oxygen demand for complete oxidation, which in conjunction with the release of hydrogen on account of the catalytic fuel conversion leads to a reactive, ignitable mixture which ensures a stable combustion process.

LIST OF DESIGNATIONS

1, 1' Combustion feed air compressor unit
2, 2' First combustion chamber
3, 3' High-pressure turbine stage
4, 4' Second combustion chamber, sequential combustion chamber
5, 5' Low-pressure turbine stage
6 Recirculation line
7 Compressor unit
8 Cooling line
9 $CO_2$ separation unit
10 Outlet line
11 Oxidation unit
12 Outlet line
13 Return line
14 Bypass line
15 Bypass line
A Exhaust gas
D Heat exchanger unit
KA1, KA2 Cooler unit
G Generator
LP, LP' Low-pressure compressor stage
HP, HP' High-pressure compressor stage
B Fuel

The invention claimed is:

1. A thermal power plant with sequential combustion and reduced $CO_2$ emissions, which includes the following components, which are connected in series via in each case at least one flow passage:
   a combustion feed air compressor unit, a first combustion chamber, a high-pressure turbine stage, a second combustion chamber and a low-pressure turbine stage, it being possible for the second combustion chamber and/or the low-pressure turbine stage to be supplied with a cooling gas stream for cooling purposes,
   wherein there is a recirculation line which feeds at least some of the exhaust-gas stream emerging from the low-pressure turbine stage to a compressor unit,
   wherein there is a cooling line, which feeds at least some of the compressed exhaust-gas stream emerging from the compressor unit to the second combustion chamber and/or the low-pressure turbine stage as a cooling gas stream for cooling purposes, and
   wherein a $CO_2$ separation unit, which separates at least fractions of $CO_2$ out of the cooling gas stream, is provided in the cooling line.

2. The thermal power plant as claimed in claim 1, wherein a cooling unit is provided in the cooling line downstream of the compressor unit and upstream of the $CO_2$ separation unit.

3. The thermal power plant as claimed in claim 1, wherein the combustion feed air compressor unit is an at least two-stage compressor unit including a low-pressure compressor part and a high-pressure compressor part and
   wherein the compressor unit corresponds to the low-pressure compressor part of the combustion feed air compressor unit.

4. The thermal power plant as claimed in claim 1, wherein downstream of the $CO_2$ separation unit the cooling line provides an outlet line which is connected to an oxidation unit, by which a fuel for firing the second combustion chamber is partially oxidized, releasing hydrogen, before the partially oxidized fuel is ignited within the second combustion chamber.

5. The thermal power plant as claimed in claim 4, wherein an outlet line is provided in the flow passage between the high-pressure turbine stage and the second combustion chamber, which outlet line opens out into the outlet line before it enters the oxidation unit.

6. The thermal power plant as claimed in claim 1, wherein the compressor unit, the combustion feed air compressor unit, the high-pressure turbine stage and low-pressure turbine stage as well as a generator are arranged on a common shaft.

7. The thermal power plant as claimed in claim 1, wherein the combustion feed air compressor unit is an at least two-stage compressor unit which includes a low-pressure compressor part and a high-pressure compressor part, and wherein at least one return line, which opens out into the high-pressure compressor part, is provided in the cooling line upstream and/or downstream of the $CO_2$ separation unit.

8. The thermal power plant as claimed in claim 1, wherein a bypass line, which bypasses the $CO_2$ separation unit is provided in the cooling line.

9. The thermal power plant as claimed in claim 3, wherein downstream of the low-pressure compressor part there is a bypass line which is connected to an oxidation unit, by which fuel for firing the second combustion chamber is at least partially oxidized before the partially oxidized fuel is ignited within the second combustion chamber.

10. The thermal power plant as claimed in claim 1, wherein a cooling unit, which separates water out of the exhaust gas stream, is provided along the recirculation line.

11. The thermal power plant as claimed in claim 1, wherein a heat exchanger unit for releasing heat to a steam cycle is provided along the recirculation line, immediately downstream of the low-pressure turbine stage.

12. The thermal power plant as claimed in claim 1, wherein the combustion feed air compressor unit, the high-pressure turbine stage and low-pressure turbine stage as well as a generator are arranged on a common first shaft and the compressor unit is arranged on a second, driven shaft.

13. The thermal power plant as claimed in claim 12, wherein a further combustion feed air compressor unit, a further high-pressure turbine stage and a further low-pressure turbine stage, as well as a further generator, are arranged along the second shaft.

14. The thermal power plant as claimed in claim 13, wherein the further combustion feed air compressor unit, the further high-pressure turbine stage and the further low-pressure turbine stage, as well as the further generator, are arranged and connected to one another in a similar way to the combustion feed air compressor unit, the high-pressure turbine stage—and the low-pressure turbine stage as well as the generator.

15. A method for operating a thermal power plant with sequential combustion and reduced $CO_2$ emissions, which includes the following components, connected in series via in each case at least one flow passage:
   a combustion feed air compressor unit, a first combustion chamber, a high-pressure turbine stage, a second combustion chamber and a low-pressure turbine stage, the second combustion chamber and/or the low-pressure turbine stage being supplied with a cooling gas stream for cooling purposes, comprising:
      recirculating at least some of the exhaust gas emerging from the low-pressure turbine stage;
      compressing the recirculated exhaust gas;
      separating $CO_2$ from the compressed exhaust as so as to lower the $CO_2$ concentration of the compressed exhaust gas; and
      providing the $CO_2$-depleted exhaust gas stream as a cooling gas stream for cooling purposes.

16. The method as claimed in claim 15, wherein the cooling gas stream is fed to the second combustion chamber and/or the low-pressure turbine stage for cooling purposes.

17. The method as claimed in claim 15, wherein the exhaust gas which emerges from the low-pressure turbine stage is fed to a heat exchanger for thermally coupling a steam cycle and/or a cooling unit before the recirculated exhaust gas is compressed.

18. The method as claimed in claim 15, wherein the recirculated exhaust gas is fed into the combustion feed air compressor unit in order to be compressed together with the combustion feed air.

19. The method as claimed in claim 18, wherein the compression takes place in stages, and
   wherein after a first compression stage has been reached, part of the precompressed exhaust gas/combustion feed air mixture is branched off, cooled and fed to a $CO_2$ separation unit.

20. The method as claimed in claim 15, wherein some of the $CO_2$-depleted exhaust gas stream is mixed with fuel, at least parts of the fuel being oxidized to form hydrogen before the mixture of $CO_2$-depleted exhaust gas and partially oxidized fuel is ignited in the second combustion chamber.

21. The method as claimed in claim 20, wherein part of a hot gas stream which emerges from the high-pressure turbine stage is mixed with the $CO_2$-depleted exhaust gas stream, and
   wherein the mixture of the hot gas stream and the $CO_2$-depleted exhaust gas stream is mixed with fuel and then partially oxidized, with hydrogen being released.

22. The method as claimed in claim 20, wherein the mixture of $CO_2$-depleted exhaust gas and the partially oxidized fuel is selected in such a manner that the oxygen fraction present corresponds to approximately 20% to 70% of the theoretical oxygen demand for complete combustion.

23. The method as claimed in claim 15, wherein the recirculated exhaust gas is, separately from the combustion feed air, compressed, cooled and fed to a $CO_2$ separation unit.

24. The method as claimed in claim 23, wherein the compressed exhaust gas, the compressed cooled exhaust gas or the compressed, cooled and $CO_2$-depleted exhaust gas is at least partially admixed with the precompressed combustion feed air.

25. The method as claimed in claim 23, wherein some of the precompressed combustion feed air is mixed with fuel, at least parts of the fuel being oxidized to form hydrogen before the mixture of $CO_2$-depleted exhaust gas and partially oxidized fuel is ignited in the second combustion chamber.

* * * * *